Feb. 2, 1926.  1,571,185
J. W. COVER ET AL
PISTON
Filed April 3, 1924
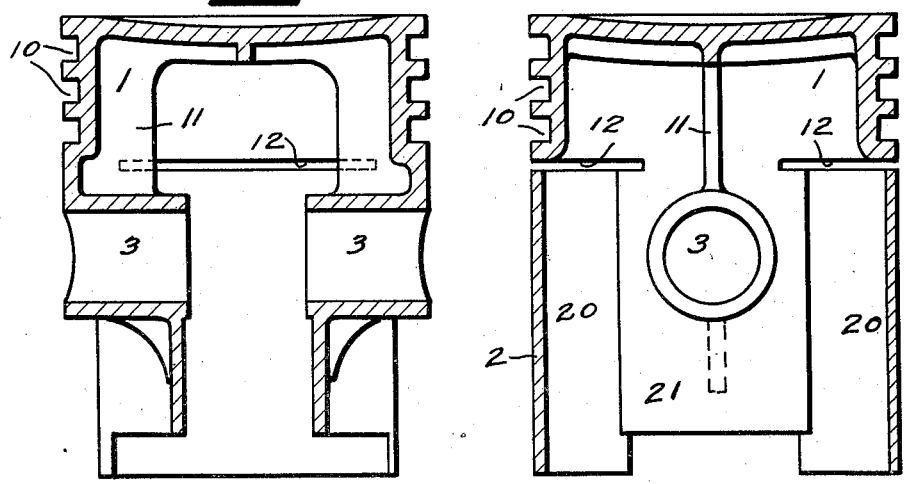
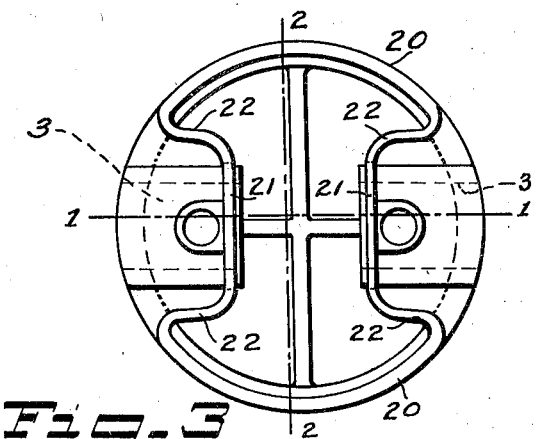
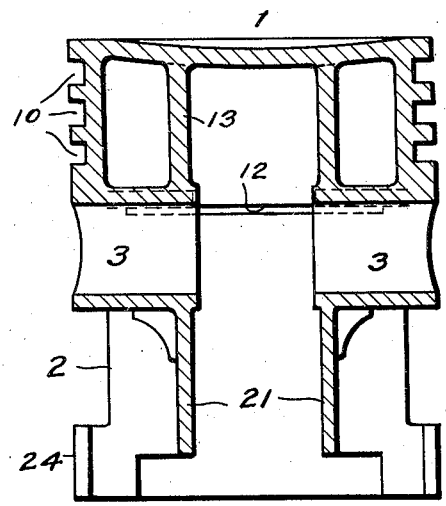
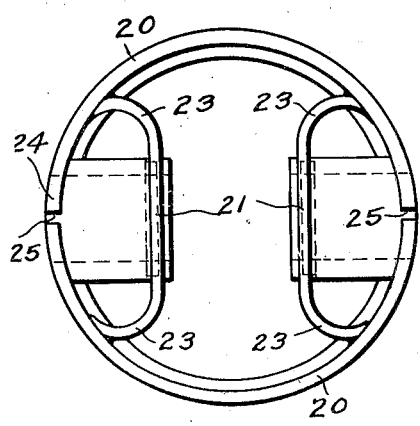
Inventor
John W. Cover
Orris F. Oliver
By H.L.&C.L. Reynolds.
Attorneys Patented Feb. 2, 1926.

1,571,185

UNITED STATES PATENT OFFICE.

JOHN W. COVER AND ORRIS F. OLIVER, OF SEATTLE, WASHINGTON.

PISTON.

Application filed April 3, 1924. Serial No. 703,853.

*To all whom it may concern:*

Be it known that we, JOHN W. COVER and ORRIS F. OLIVER, citizens of the United States of America, and residents of the city of Seattle, in the county of King and State of Washington, have invented certain new and useful Improvements in Pistons, of which the following is a specification.

Our invention relates to pistons intended for use in internal combustion engines. It consists of a piston having a skirt which is semi-detached from the head, and in which the skirt is so designed that while it is integral, that is not slit, the expansion resulting from heating is taken care of in such a way as to prevent gripping or freezing on the cylinder walls.

Our invention, while suited for application in pistons made of other metals and alloys, is more particularly designed for and applicable to pistons made of alloys, such for instance as alloys of aluminum, which have coefficients of expansion greater than that of cast iron, of which the cylinder walls are chiefly made.

The object of our invention is to so design a piston that the skirt may have a snug sliding bearing on the inner wall of the cylinder when cold, and in which the unequal expansion which is almost certain to occur, due to the heat of the explosions in the cylinder, may be compensated for and undue pressure between the side walls of the piston and cylinder will be prevented.

The special features of our invention which we believe to be new and upon which we desire to obtain a patent, will be first described in the following specification and then particularly defined in the claims terminating the same.

In the accompanying drawings we have shown our invention embodied in forms which we now prefer and which are suitable for illustrating the principles of our invention.

Figures 1 and 2 are longitudinal sections of a piston containing our invention, these being taken respectively upon the planes 1—1 and 2—2 of Figure 3.

Figure 3 is a view of the inner or lower end of the piston.

Figure 4 is a section taken upon a plane corresponding with the plane 1—1 of Figure 3, or a piston in which the interior construction is slightly modified from those shown in Figures 1 and 2.

Figure 5 is an end view of a piston showing modifications as in Figure 4, and other features wherein it differs from that of Figures 1, 2 and 3.

Pistons as ordinarily made for internal combustion engines have a head section which contains the grooves for the reception of the piston rings, and a skirt section, the latter forming the major part, if not all, of the bearing against the cylinder wall, which is relied upon to take the side thrust caused by the angular position of the connecting rod.

Due to the fact that the piston of an internal combustion engine cannot be cooled in the same manner as is employed for the cylinder, it is necessary that the head section of the piston be made sufficiently smaller in diameter than the inner diameter of the cylinder, so that the expansion produced by this heat in the head will not cause it to bind or freeze against the cylinder wall. The tightness of the piston, for the prevention of the escape of gas, is secured by the piston rings.

It is manifestly desirable that the skirt section of the piston, which forms the side thrust bearing surface engaging the cylinder wall, should fit snugly at all times and yet that the construction be such that freezing or fusion with the cylinder wall shall not occur. To prevent this a method has been adopted, which consists in longitudinally slitting the skirt of the piston so that expansion occurring therein may be compensated for by permitting a limited amount of peripheral movement and bending of the slit sections. When this is done the side thrust applied to the piston by the connecting rod when in its maximum angular position, causes what is known as "piston slap," which is objectionable.

In our present invention we shape the skirt of the piston so that it has two large circular segments which will snugly bear against the side of the cylinder, even when cold, and connect these bearing segments by a wall which is displaced well inwardly from the wall of the cylinder, and connect said inwardly displaced sections with the circular segment bearing sections by portions of the wall which extend in approximately a radial position, or in such position that the expansive action on the bearing segments may be taken care of by bending of these connecting sections.

The section 1 of the piston is the head section, which head section is provided with grooves as 10 for the reception of piston packing rings. The skirt 2 has two oppositely positioned segments 20 which are of such diameter as to snugly fit within the cylinder. These segments are of such peripheral extent as to furnish a liberal bearing surface for engagement with the cylinder wall, and are so located with respect to the position of the wrist pin of the piston that the side thrust will be applied thereto. The wrist pin by which the piston is connected with the connecting rod, is carried in bosses or cylinders 3, which are integrally cast with the piston and skirt. The axis of the wrist pin lies in a plane which is perpendicular to the central plane of the bearing segments 20. The skirt below the head 1 has that portion of its walls which lie between the bearing segments 20, displaced inwardly preferably, so far as may be done without interfering with the placing and operation of the connecting rod. Such intermediate segments 21 are shown as connected with the wrist pin receiving bosses 3 close to the inner end thereof. The outer ends of the same bosses are directly connected with the outer wall of the head, as is clearly shown in the section of Figure 1. These wrist pin receiving bearings 3 are preferably also connected with the head and the head is stiffened by means of webs as 11, which are located in the plane of the bearings 3. This construction provides a strong and rigid connection between the wrist pin and the head section of the piston.

The adjacent edges of the curved bearing segments 20 and the intermediate sections 21 are connected by sections 22 which extend somewhat in a radial direction. Preferably these sections are connected with the sections 20 and 21 by curves so as to avoid any sharp angles. The direction of extent of these connecting sections is such that it has as large a radial component as is feasible. The purpose is to make of these compensating sections yielding members to take care of the expansion occurring in the bearing sections 20. As the latter expand, the compensating sections 22 and the connection of said compensating sections with the other sections 20 and 21 will give or spring, and thus prevent undue pressure between the bearing sections 20 and the wall of the cylinder. The bearing sections 20 function in the same way as the cross head slide of engines which are provided with cross head and slide outside of the cylinder.

The slide or bearing sections 20 are detached from direct connection with the head 1 by two peripherally extending slots 12. This forms a break between the bearing or slide section of the skirt and the head so that heat will not be directly conducted from one to the other. These slits are made in the extreme end of the skirt section of the piston which is next to the head.

In Figure 5 a slightly different type of connection between the sections 21 and 20 of the skirt is shown. This consists of a simple curve 23. In the same figure a slight modification is shown which consists in extending the extreme lower portion of the skirt as arms 24 which complete the circular bearing of this extreme lower end of the skirt, excepting for slots 25 which extend transversely of these bars, that is lengthwise of the piston. These will function as oil wiping arms and if such be desired they may be grooved for the reception of an expansion ring.

The slide bearing sections 20 of the piston skirt are detached by the slits 12 so that heat is not conveyed thereto from the head section 1 by direct conduction. It however acquires heat from the cylinder walls of which a part may be heat generated by friction. Heat tends to expand the bearing section 20 of the skirt. This expansion acts tangentially upon the radial sections 22 to bend them. Such bending causes a pivotal movement or swing about the inner edges of the sections 21 which draws the connected edges of the slide sections 20 inwardly or towards the piston axis. This action relieves the pressure of the slide sections 20 upon the cylinder walls and prevents freezing.

It is thus seen that the heat which causes expansion in the piston skirt, by reason of the peculiar construction, causes the bearing section of the skirt to be drawn inwardly, thus relieving the pressure between the piston skirt and the cylinder wall.

What we claim as our invention is:

1. A piston for internal combustion engines consisting of a head section, a skirt section and wrist pin bosses formed as an integral casting, the skirt section being peripherally continuous without a slit and having two oppositely positioned slide bearing segments which are separated from direct connection with the head by peripheral segment slits, the wrist pin bosses having direct connection with the head and expansion compensating members consisting of webs connecting the wrist pin bosses with the side edges of the slide segments and each having a component of material width lying in a plane which is substantially parallel with the axis of both the wrist pin and the piston.

2. A piston for internal combustion engines consisting of a head section, a skirt section and wrist pin bosses formed as an integral casting, the skirt section being peripherally continuous without a slit and having two opposite slide segments which are separated from direct connection with the head by peripheral slits, the edges of the slide segments being connected by webs which form a U-shape with the sides of the U lying parallel with and at opposite sides of a plane which includes the axis of both the piston and the wrist pin, said webs connecting with the slide segments at the outer ends of the U and with the wrist pin bosses by the base of the U.

3. A piston for internal combustion engines consisting of a head section and a skirt section formed as an integral casting, the skirt section being peripherally continuous without a slit and consisting of wrist pin bosses which are connected at their outer ends with the head, webs connecting with the inner ends of said bosses and extending in planes which are substantially perpendicular to the wrist pin axis, two slide segments at opposite sides of the wrist pin plane which includes the piston axis, said slide segments being disconnected from the head by peripheral segment slits, and expansion compensating webs connecting adjacent edges of the slide segments and the first mentioned webs and lying substantially in planes which are parallel with both the piston axis and the wrist pin axis.

4. In a piston construction an integral casting comprising a circumferentially grooved, ring receiving head and a skirt, said skirt comprising a plurality of diametrically opposed bearing slide segments the outer faces of which are of curvilinear form and a pair of deep diametrically opposed inward folds which include elastic portions, said folds extending between and connecting the edges of the slide segments, the said casting being circumferentially slit between the head and the slide bearing segments to permit expansive movement of the latter independently of the head.

5. In a piston construction an integral casting comprising a circumferentially grooved, ring receiving head and a skirt, said skirt comprising a plurality of diametrically opposed bearing slide segments the outer faces of which are of curvilinear form, a pair of deep diametrically opposed inward folds which include elastic portions, said folds extending between and connecting the edges of the slide segments, the said casting being circumferentially slit between the head and the slide bearing segments to permit expansive movement of the latter independently of the head and wrist pin bearing members carried by the material of the folds.

Signed at Seattle, King County, Washington, this 28th day of March 1924.

JOHN W. COVER.
ORRIS F. OLIVER.